United States Patent Office 3,085,122
Patented Apr. 9, 1963

3,085,122
METHOD FOR SELECTIVELY REMOVING ISO-
BUTYLENE FROM A HYDROCARBON STREAM
BY MEANS OF A CHLORO CARBOXYLIC ACID
Howard V. Hess, Glenham, and George W. Eckert, Wappingers Falls, N.Y., assignors to Texaco Inc., New York, N.Y., a corporation of Delaware
No Drawing. Filed July 6, 1960, Ser. No. 41,018
3 Claims. (Cl. 260—677)

This invention relates to a method of recovering pure isobutylene from a mixture of $C_4$ hydrocarbons. More specifically, it pertains to a method for treating a mixture of $C_4$ hydrocarbons with a chloro fatty acid of 2 to 4 carbon atoms having 1 to 3 chlorine atom substituents on the beta carbon atom in a manner to remove selectively isobutylene in the form of a tertiary(t) butyl ester of the chloro fatty acid which ester is subsequently decomposed to yield pure isobutylene.

Pure isobutylene is in demand for the preparation of butyl rubber and liquid polyisobutylenes which are widely used in the manufacture of lubricant additives and adhesives. It is also useful as a starting material for isoprene manufacture by a series of reactions involving condensation of formaldehyde and isobutylene to yield a dioxane which is decomposed to form isoprene. In addition, a pure isobutylene is useful as a starting reactant in the production of t-butyl acetate, the latter product being an outstanding octane appreciator for gasoline.

Many present procedures for the manufacture of isobutylene do not produce a pure isobutylene product without complex after treatments and/or produce an isobutylene product in relatively low yields. One commercial procedure for obtaining isobutylene involves a treatment of a $C_4$ refinery stream ("B-B" stream) comprising butane, isobutane, butene and isobutylene with cold sulfuric acid which preferentially extracts isobutylene. On heating the isobutylene-containing sulfuric acid extract phase, the isobutylene dimerizes and is recovered therefrom as diisobutylene, which on cracking yields an isobutylene monomer. This method of obtaining isobutylene from a $C_4$ hydrocarbon mixture has the disadvantage that the isobutylene thus produced contains as impurities n-butane, butadiene and sulfur compounds.

Another method of isolating isobutylene from a mixture of hydrocarbons comprises treating a mixture of hydrocarbons containing isobutylene with an unsubstituted fatty acid in the presence of acid condensation catalyst to selectively form a t-butyl ester and subsequently decomposing the thus formed t-butyl ester at a temperature between 100 and 510° F. to reform the isobutylene and fatty acid which are then separated by standard means. Although this latter method effectively separates isobutylene from the mixture of hydrocarbons, it gives substantially lower yields of isobutylene product in comparison to our novel process and requires the use of catalyst to decompose t-butyl ester at temperatures below 400° F.

The method of this invention provides a process of recovering pure isobutylene from a $C_4$ hydrocarbon mixture through the intermediate formation and decomposition of a t-butyl ester of a chloro fatty acid having from 2 to 4 carbon atoms and 1 to 3 chlorine atoms substituted on the "2" position carbon of the acid.

The process of this invention involves contacting a $C_4$ hydrocarbon mixture containing isobutylene with a chloro fatty acid selected from the group consisting of monochloroacetic, dichloroacetic, trichloroacetic, 2-chloropropionic, 2,2-dichloropropionic, 2-chlorobutyric, 2-chloroisobutyric and 2,2-dichlorobutyric in a reaction zone under conditions adapted for the formation of the t-butyl chloroester to the exclusion of the corresponding primary and secondary butyl chloroesters, separating unreacted $C_4$ hydrocarbons from the t-butyl chloroester-containing reaction mixture, subjecting the $C_4$ hydrocarbon-free t-butyl chloroester reaction mixture to thermal treatment whereby the t-butyl chloroester decomposes to reform the chloro fatty acid and pure isobutylene. The chloro fatty acid formed on decomposition of the t-butyl chloroester is normally recycled to prepare additional quantities of t-butyl chloroester by contact with isobutylene-containing $C_4$ hydrocarbon mixtures. Similarly, at least a portion of the unreacted $C_4$ hydrocarbons separated from the t-butyl chloroester reaction mixture is advantageously recycled to the chloroester forming reaction step to separate unreacted isobutylene therefrom. Prior to recycle, the unreacted $C_4$ gas stream is advantageously subjected to an isomerization step to form additional quantities of isobutylene.

One advantage of the novel process of the invention over prior art methods of separating isobutylene from $C_4$ hydrocarbon mixtures is the subject method does not require a catalyst to insure the decomposition of the t-butyl chloroester intermediate to form the pure isobutylene product at temperatures below 400° F.

Another advantage of our method resides in the fact that it is conducted at moderate temperatures, e.g. 70 to 325° F., while in the past one non-catalytic method had to be operated at temperature well below 70° F. because the esterfying agent employed would cause undue polymerization at the higher temperatures. It is obvious that our operative temperature range is most satisfactory from a commercial point of view since it does not require extensive cooling or high temperature apparatus.

The mixture of $C_4$ hydrocarbons utilized by the process of the invention is normally obtained as a by-product of a refinery process such as catalytic cracking, thermal cracking and catalytic reforming. A typical $C_4$ hydrocarbon mixture obtained as a by-product of fluid catalytic cracking comprises 45–60 mol percent n-butane and isobutane, 10–25 mol percent isobutylene and 15–45 mol percent n-butenes. A mixture of $C_4$ hydrocarbons obtained from any refinery process, normally called a "B–B" stream, or a blend of $C_4$ hydrocarbon mixtures from different refinery processes is employed in the process of this invention.

The chloro fatty acids employed in the method of the invention have been heretofore described. Dichloroacetic acid and trichloroacetic acid have proven particularly useful in the process of the invention and are the preferred agents.

The isobutylene fraction of the $C_4$ hydrocarbon mixture is advantageously present in the ester-forming step in a mol excess over the amount required for complete reaction with the chloro fatty acid reactant. The mol ratio of isobutylene to chloro fatty acid present in the $C_4$ hydrocarbon mixture is maintained broadly between about 0.5:1 and 2:1. Lower and higher mol ratios may be used but lower ratios create acid handling problems and higher ratios are less effective in removing isobutylene from a "B–B" stream. The desired mol ratio isobutylene component of the $C_4$ hydrocarbon mixture to acid is simply maintained by recycling acid from the decomposition of the t-butyl chloroester.

The ester forming step can be represented by the following equation using monochloroacetic acid as the chloro fatty acid reactant:

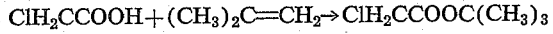

$$ClH_2CCOOH + (CH_3)_2C{=\!=}CH_2 \rightarrow ClH_2CCOOC(CH_3)_3$$

Contact of the $C_4$ hydrocarbon mixture (e.g. "B–B" stream) with a chloro fatty acid to form the t-butyl chloroester to the exclusion of secondary esters is effected at a temperature between about 70 and 100° F. at a pressure between about 0 and 500 p.s.i. Under the reaction conditions the $C_4$ hydrocarbon mixture is either a gas or a liquid depending on the reaction pressure and temperature. For best results the acid reactant should be maintained in the liquid phase and this can be accomplished by the employment of elevated pressure and/or a substantially inert organic liquid solvent for the acid reactant such as benzene, cyclohexane, methyl ethyl ketone, dioxane or diisopropyl ether, whenever necessary. The maintenance of the acid reactant in the liquid phase in the ester-forming step coupled with the operation of the process within the prescribed temperature and pressure ranges assures the formation of a t-butyl chloroester in high yields to substantial exclusion of other ester products. Specific examples of some of the butyl chloroester intermediates contemplated herein are t-butyl-2,2,2-trichloroacetate, t-butyl-2,2-dichloropropionate and t-butyl-2-chloroisobutyrate.

In the above described ester-formation step, esterification catalysts may be employed to insure maximum yields but are not necessary for adequate yields. The most commonly employed catalyst for the ester-forming reaction are acid condensation catalysts such as sulfuric acid, phosphoric acid and organic substituted derivatives thereof containing at least one acid hydrogen atom such as benzenesulfonic acid, alkyl hydrogen sulfates, alkyl dihydrogen phosphates and other strong non-volatile mineral and organic acids. In addition to the acid condensation catalysts, solid heterogeneous condensation catalyst may be employed. Specific examples of the solid heterogeneous condensation catalyst contemplated herein are the period 3 polyvalent metal silicates such as magnesium silicate, aluminum silicate or a mixture of magnesium and aluminum silicates. The concentration of strong mineral acid, organic acid or solid heterogeneous condensation catalyst in the ester-forming reaction is usually between 0.1 and 5.0 wt. percent or more of the reaction mixture comprising the chloro fatty acid and $C_4$ hydrocarbon mixture.

The ester-forming step may be either a batch or a continuous operation. In one continuous process the gaseous $C_4$ hydrocarbon mixture and chloro fatty acid may be passed in countercurrent flow to one another with the $C_4$ hydrocarbon mixture minus the isobutylene component exiting from the top of the reactor and the t-butyl chloroester, excess chloro fatty acid and solvent (if used) being withdrawn from the bottom of the countercurrent flow apparatus. An alternative continuous process can be effected by continuously passing the $C_4$ hydrocarbon mixture into the chloro fatty acid reactant while continuously or intermittently withdrawing portions of the thus contacted liquid phase and replacing the thus withdrawn portions with fresh chloroacetic acid.

In a batch procedure a pressure reactor can be partially filled with the chloro fatty acid reactant and then pressured with the $C_4$ hydrocarbon mixture or said mixture can be bubbled through said acid in a reactor under atmospheric pressure.

The t-butyl chloroester product produced in the esterification step is then decomposed at an elevated temperature to evolve isobutylene and chloro fatty acid. This decomposition is represented by the following equation using t-butyl dichloroacetate as the example product:

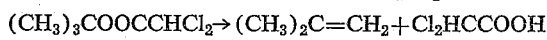
$$(CH_3)_3COOCCHCl_2 \rightarrow (CH_3)_2C=CH_2 + Cl_2HCCOOH$$

The decomposition of the t-butyl chloroester can take place with or without its isolation from the crude esterification reaction mixture. However, isolation of the t-butyl chloroester prior to decomposition is desirable in that it aids in the recovery of the isobutylene product resulting from the decomposition by pyrolysis of the t-butyl chloroester. The separation of the t-butyl chloroester from the esterification reaction mixture is accomplished by any standard means. For example the reaction mixture normally contains t-butyl chloroester, unreacted chloro fatty acid, catalyst (if used) and solvent (if used). If the catalyst is a solid in the liquid reaction mixture it may be separated by filtration. The unreacted chloro fatty acid and liquid acid catalyst (if used) may be selectively extracted from the reaction mixture utilizing water and an aqueous base and then subjecting the thus washed mixture, preferably after drying, to fractional distillation under reduced pressure at temperatures advantageously below 100° F. to collect the t-butyl chloroester as distillate. Specific examples of the aqueous base, previously mentioned, are 5–15 wt. percent aqueous solutions of sodium carbonate, sodium hydroxide or calcium hydroxide.

In any case whether the t-butyl chloroester is in isolated or unisolated form it is heated to a temperature between about 175 and 325° F. under atmospheric or reduced pressure with isobutylene being evolved as a gas and collected by standard means such as by condensation or compression. The regenerated chloro fatty acid resulting from the decomposition of the t-butyl chloroester remains as residue and can either be sent to storage or recycled to the first step of the method.

The materials of construction employed in the apparatus utilized in our process are preferably corrosion-resistant, e.g. copper, austenitic stainless steel, glass-lined, impervious graphite or the like.

The process of the invention is illustrated in the subsequent three examples. The "B–B" stream employed in subsequent Examples I, II and III was of the following composition:

| Components: | Weight percent |
|---|---|
| Ethane | Trace |
| Propane | 3.1 |
| Propylene | 1.1 |
| Isobutane | 10.2 |
| n-Butane | 42.4 |
| Butylene-1 | 15.1 |
| Isobutylene | 14.3 |
| Trans-butylene-2 | 7.5 |
| Isopentane | 0.6 |
| Cis-butylene-2 | 5.5 |

In addition the esterification steps of Examples I–III were conducted in a stainless steel draft tube reactor fitted with a jacket for heat exchange purposes. Inside the reactor there is situated a tube having an entrance and exit to the remainder of the reactor space. Located in the tube is a propeller-type stirrer. When the stirrer is actuated it circulates the vessel's contents downwardly through the inside of the tube and upward between the reactor and tube wall.

*Example 1*

To a 2000 milliliter draft tube reactor, there were added 129 grams of dichloroacetic acid, 100 grams of benzene and 6 grams of concentrated sulfuric acid. The resultant mixture was heated to and maintained at a temperature between 75 and 80° F. for a period of 4 hours during which time it was constantly stirred. During the first hour of the reaction period 1000 grams of a "B–B" stream were introduced into the mixture of dichloroacetic acid, benzene and sulfuric acid. The reactor pressure during the reaction period ranged between 148 and 150 p.s.i.g. At the end of the 4 hour period the reactor was vented and the liquid reaction mixture remaining therein was successively washed with 2000 milliliters water, 2000 milliliters of 5–10% sodium carbonate, and 2000 milliliters water. One hundred eighty-six grams of the washed product were subjected to vacuum distillation under a pressure of 2.2 mm./Hg. One hundred sixty-three grams of t-butyl dichloroacetate were collected at a temperature between 25 and 35° F. representing a yield of 87.6% based on the acid reactant. Fifty grams of the thus recovered acetate were heated under atmospheric pressure to a temperature between 273 and 276° F. for a period of 4 minutes. Thirteen grams of pure isobutylene were evolved and collected in a cold trap. Theoretical yield of isobutylene is 15 grams based on the ester charge.

Example II

To a 2000 milliliter draft tube reactor, there were added 164 grams of trichloroacetic acid, 100 grams of benzene, and 6 grams of concentrated sulfuric acid. The reactor was then pressured with 1000 grams of a "B–B" stream resulting in a reactor pressure of 70–71 p.s.i. The resultant reaction mixture was heated to a temperature between 80 and 86° F. for a period of 3.5 hours during which time it was constantly stirred. At the end of the 3.5 hour reaction period the reactor was vented leaving a liquid solution. Two hundred twenty-five grams of the liquid solution were washed as in Example I and the washed product was distilled under a pressure of 3.3 mm./Hg. The cut collected at between 35 and 45° F. weighed 170 grams and was identified as t-butyl trichloroacetate. The yield of ester product was 77.4 wt. percent based on the trichloroacetic acid reactant. Fifty grams of the thus recovered distillate were heated to a temperature between 242 and 345° F. for a period of 10 minutes and 10 grams of pure isobutylene were evolved overhead and collected in a cold trap. The theoretical yield of pure isobutylene based on the t-butyl trichloroacetate charge was 12 grams.

Example III

To a 2000 milliliter reactor 163.5 grams of trichloroacetic acid and 300 grams of benzene were added. The reactor then was pressured with 750 grams of a "B–B" stream and heated to a temperature between 154 and 170° F. The reaction mixture was stirred for a period of 7 hours at this temperature during which time the reactor pressure ranged between 80 and 125 p.s.i. At the end of the 7 hour period the reactor was vented and 360 grams of the final liquid reaction mixture were washed as in Example I and the washed product subjected to distillation under a pressure of 3.2 mm./Hg. One hundred forty-four grams of t-butyl trichloroacetate were collected at between 30 and 39° F. representing a theoretical yield of 65.6% based on the trichloroacetic acid reactant. One hundred twenty-two grams of the thus collected t-butyl ester were heated at a temperature of between 238 and 324° F. at atmospheric pressure for a period of 10 minutes. During the 10 minute period, 23 grams of pure isobutylene were evolved and collected in a cold trap. The theoretical yield of isobutylene based on the ester charge is 31 grams.

For comparison the dichloroacetic acid and the trichloroacetic acid were replaced with acetic acid in the procedures of Examples I to III and the yield of tertiary butyl acetate was found to be less than 5% based on the acetic acid reactant. In comparison the yield of ester when dichloro and trichloroacetic acid are employed ranges between 65.6% and 87.6%. The more than 12 fold increase of yield of ester intermediate product when a chloroacetic acid is substituted for acetic acid is proportionally reflected in the yield of pure isobutylene upon the decomposition of the ester intermediate.

All percentages and ratios recited hereinbefore and hereinafter are based on weight unless otherwise stated.

We claim:

1. A process for separating isobutylene from a mixture of $C_4$ hydrocarbons consisting essentially of contacting said $C_4$ hydrocarbon mixture with a chloro fatty acid selected from the group consisting of monochloroacetic, dichloroacetic, trichloroacetic, 2-chloropropionic, 2,2-dichloropropionic, 2-chlorobutyric, 2-chloroisobutyric and 2,2-dichlorobutyric in a mol ratio of said acid to said isobutylene of between about 0.5:1 and 2.0:1, at a temperature between about 70 and 100° F. and at a pressure between 0 and 500 p.s.i. to form a t-butyl ester of said chloro fatty acid, separating said t-butyl ester from the reaction mixture, decomposing said t-butyl ester with heat alone at a temperature between about 175 and 325° F. to form said chloro fatty acid and isobutylene and separating said isobutylene from said chloro fatty acid.

2. A method in accordance to claim 1 in which the reaction of said chloro fatty acid with said isobutylene-containing $C_4$ hydrocarbon mixture is effected in the presence of an esterification catalyst selected from the group consisting of mineral acids, organic acids, and solid period 3 polyvalent metal silicate.

3. A method in accordance with claim 2 wherein said esterification catalyst is present in an amount between about 0.1 and 5 wt. percent based on the weight of said chloro fatty acid and said isobutylene.

References Cited in the file of this patent
UNITED STATES PATENTS

| | | |
|---|---|---|
| 1,939,384 | Buc | Dec. 12, 1933 |
| 2,775,633 | Fenske et al. | Dec. 25, 1956 |

OTHER REFERENCES

Scovill et al.: Jour. Am. Chem. Soc., vol. 66, page 1039 (1944).